United States Patent Office 3,238,135
Patented Mar. 1, 1966

3,238,135
PROCESS FOR PRODUCING CADMIUM-BEARING FERRITES
Gordon J. Maxson and Edward J. Motyl, Downers Grove, Ill., assignors to Western Electric Company, Incorporated, New York, N.Y., a corporation of New York
No Drawing. Filed Feb. 19, 1963, Ser. No. 259,748
12 Claims. (Cl. 252—62.5)

This invention relates to a process for producing cadmium-bearing ferrites, and more particularly to a process for producing cadium-bearing ferrites which have improved magnetic characteristics. It is an object of this invention to provide an improved process of such a character.

In producing ferrites which exhibit rectangular hysteresis loop characteristics, those skilled in the art have found that the squareness of the hysteresis loop may be improved by adding 2 to 13 mol percent of cadmium oxide to a basic ferrite-forming mixture before the mixture is heat treated to form the ferrite. For such a ferrite the basic mixture conventionally consists of 5–60 mol percent of manganese oxide, 8–50 mol percent of magnesium oxide, and 25–50 mol percent of ferric oxide.

It is another object of this invention to provide a process for producing cadmium-bearing ferrites which have improved hysteresis loop characteristics.

It is still anothe object of this invention to provide a process for producing a cadmium-bearing ferrite which has retained substantially all of the cadmium contained in the originally fired material.

It is a further object of this invention to provide a process for producing a cadmium-bearing ferrite which has an increased output voltage.

In accordance with this invention, a cadmium-bearing, ferrite-forming material is heated from at least a critical temperature of approximately 1600° F. to its final firing temperature at a rate of no less than 300° F. per hour but not in excess of 600° F. per hour.

It is believed that the beneficial effect derived from the addition of cadmium is lost if the ferrite-forming materials are not heated to the final firing temperature at a heating rate which falls within these prescribed limits. For example, if the ferrite-forming material is brought to its final firing temperature at a heating rate of 100 to 250° F. per hour, noticeable deposition of cadmium is found in the firing chamber after a temperature of approximately 1600° F. has been passed. It is believed that this cadmium deposition is attributable to the fact that the cadmium oxide, which has a boiling point of approximately 1650° F., has sufficient time to volatize during the relatively slow heating period which proceeds the firing temperature at which the cadmium will react with the other ferrite-forming materials. However, if the heating rate from 1600° F. to a final firing temperature of between about 2300 and 2500° F. is held in the range of 300 to 600° F. per hour, the deposition of cadmium is substantially reduced and the ferrite so formed has improved hysteresis loop characteristics. Heating rates in excess of 600° F. per hour have been found to cause such physical deterioration of the ferrite parts as cracking and checking which substantially impair the electrical qualities of the ferrites so produced.

This invention, together with further objects and advantages thereof, will best be understood by reference to the following examples.

*Example 1*

A mixture of the following ferrite-forming materials

|  | Mol percent |
|---|---|
| $Fe_2O_3$ | 42.59 |
| MnO | 25.06 |
| MgO | 22.76 |
| CdO | 9.59 | is made in accordance with any of the methods well known in the art. One of such known methods of preparing a ferrite-forming material is outlined in the examples of G. J. Maxson Patent 2,956,024. The material is then molded into the shape of magnetic memory core rings and fired in accordance with the following process. The cores are (1) fired in oxygen to a temperature of 2400° F.; (2) held in an oxygen atmosphere at the firing temperature for a period of six hours; and (3) cooled in a nitrogen atmosphere to room temperature at a rate of 400° F.

During step (1) of the process the core rings are heated from a temperature of 1600° F. to the final firing temperature at a rate of 200° F. per hour.

The resultant ferrite cores have an output voltage of 59 mv. Output voltage is a measure of the rate of flux change per unit of time and is determined by measuring the output voltage of the core when said core is subjected to square wave current pulses of opposing polarity which are of sufficient magnitude and length to cause effective flux reversals of the core.

*Example 2*

The same material as set forth in Example 1 is treated in accordance with the process outlined in that example with the single exception that during step (1) the core rings are heated from the temperature of 1600° F. to the final firing temperature at a rate of 320° F. per hour.

In this case, the output voltage was 130 mv. This is an increase in output voltage of 2.21 times over that obtained from the cores fired in accordance with the process outlined in Example 1.

*Example 3*

The procedure as outlined in Example 2 is followed again with the single exception that the heating rate from 1600° F. to the final firing temperature is increased to 380° F.

In this case the output voltage was again 130 mv., the same as is obtained in following the process outlined in Example 2.

*Example 4*

Again the process outlined in Example 2 is followed with the single exception that the heating rate from 1600° F. to the final firing temperature is increased to 500° F. per hour.

In this case the output voltage obtained is 122 mv. which is 2.07 times as great as that obtained from the process outlined in Example 1.

Since the process of this invention relates solely to a single step in a heat treatment process for a cadmium-bearing ferrite, the specific examples disclosed are deemed sufficient to teach those skilled in the art both the process and the value of utilizing such a process in making these particular ferrites. The proposed process is carried out in precisely the same manner as is described in conjunction with the specific examples no matter what basic mixture is utilized out of the many formulations possible from the disclosed ranges for the basic mixture.

While several specific examples of the process of the invention have been disclosed, there are many non-critical points involved therein. Some of these points are as follows.

During the initial heating step (1), the rate at which the ferrite-forming material is brought from room temperature to 1600° F. is not critical. However, for simplicity in furnace control it may be easiest to use the same heating rate as is utilized in heating the ferrite from 1600° F. to the final firing temperature.

The time for which the ferrite parts are held at the firing temperature is also non-critical, and may vary, for example, from two to ten hours depending on the size and quantity of parts being fired.

The cooling of the ferries from the final firing temperature to room temperature may be accomplished in several ways. For example, the parts may be cooled in a nitrogen atmosphere at a rate of between about 200 to 500° F. per hour, or they may be quenched to room temperature in any suitable atmosphere.

The present invention discloses a process for producing a cadmium-bearing ferrite which has improved magnetic properties. The process includes a critical step of firing the ferrite-forming material from a temperature of 1600° F. to its final firing temperature at a rate of no less than 300° F. per hour but not in excess of 600° F. per hour.

In utilizing the process of this invention, it has been found that better results are obtained when the ferrite-forming material is fired at a rate of at least 350° F. per hour but not in excess of 550° F. per hour. Also, it has been found that within this range there is an optimum firing temperature range of 400 to 500° F. per hour.

The basic concept underlying the invention as both described above and set forth in the specific examples is one which will have many apparent modifications. It is intended that the invention be interpreted as including all the modifications which fall within the true spirit and teachings thereof.

What is claimed is:

1. In a process for heat treating a ferrite containing 5 to 60 mol percent manganese oxide, 8 to 50 mol percent magnesium oxide, and 2 to 13 mol percent cadmium oxide, the balance being iron oxide, wherein the ferrite material is (1) heated in oxygen to a firing temperature between about 2300° and 2500° F., (2) it is held in an oxygen atmosphere at the firing temperature, and (3) it is cooled to room temperature, the improvement in step (1) of:
heating the ferrite from a temperature of 1600° F. to the final firing temperature at a rate of at least 300° F. per hour but not in excess of 600° F. per hour.

2. The process as defined in claim 1 wherein the ferrite is heated from a temperature of 1600° F. to the final firing temperature at a rate of at least 350° F. per hour but not in excess of 550° F. per hour.

3. The process as defined in claim 1 wherein the ferrite is heated from a temperature of 1600° F. to the final firing temperature at a rate of at least 400° F. per hour but not in excess of 500° F. per hour.

4. In a process for heat treating a ferrite containing 5 to 60 mol percent manganese oxide, 8 to 50 mol percent magnesium oxide, and 2 to 13 mol percent cadmium oxide, the balance being iron oxide, wherein the ferrite material is (1) heated in oxygen to a firing temperature between about 2300° and 2500° F., (2) it is held in an oxygen atmosphere at the firing temperature for a period of two to ten hours, and (3) it is cooled in a nitrogen atmosphere at a rate of 200 to 500° F. per hour, the improvement in step (1) of:
heating the ferrite from a temperature of 1600° F. to the final firing temperature at a rate of at least 300° F. per hour but not in excess of 600° F. per hour.

5. The process as defined in claim 4 wherein the ferrite is heated from a temperature of 1600° F. to the final firing temperature at a rate of at least 350° F. per hour but not in excess of 550° F. per hour.

6. The process as defined in claim 4 wherein the ferrite is heated from a temperature of 1600° F. to the final firing temperature at a rate of at least 400° F. per hour but not in excess of 500° F. per hour.

7. In a process for heat treating a ferrite containing 20 to 30 mol percent manganese oxide, 20 to 30 mol percent magnesium oxide, and 5 to 10 mol percent cadmium oxide, the balance being iron oxide, wherein the ferrite material is (1) heated in oxygen to a firing temperature between about 2300° and 2500° F., (2) it is held in an oxygen atmosphere at the firing temperature for a period of two to ten hours, and (3) it is cooled in a nitrogen atmosphere at a rate of 200 to 500° F. per hour, the improvement in step (1) of:
heating the ferrite from a temperature of 1600° F. to the final firing temperature at a rate of at least 300° F. per hour but not in excess of 600° F. per hour.

8. The process as defined in claim 7 wherein the ferrite is heated from a temperature of 1600° F. to the final firing temperature at a rate of at least 350° F. per hour but not in excess of 550° F. per hour.

9. The process as defined in claim 7 wherein the ferrite is heated from a temperature of 1600° F. to the final firing temperature at a rate of at least 400° F. per hour but not in excess of 500° F. per hour.

10. In a process of heat treating a ferrite containing 24 to 26 mol percent manganese oxide, 21 to 23 mol percent magnesium oxide, and 8 to 10 mol percent cadmium, the balance being iron oxide, wherein the ferrite material is (1) heated in oxygen to a firing temperature between about 2300° and 2500° F., (2) it is held in an oxygen atmosphere at the firing temperature for a period of two to ten hours, and (3) it is cooled in a nitrogen atmosphere at a rate of 200 to 500° F. per hour, the improvement in step (1) of:
heating the ferrite from a temperature of 1600° F. to the final firing temperature at a rate of at least 300° F. per hour but not in excess of 600° F. per hour.

11. The process as defined in claim 10 wherein the ferrite is heated from a temperature of 1600° F. to the final firing temperature at a rate of at least 350° F. per hour but not in excess of 550° F. per hour.

12. The process as defined in claim 10 wherein the ferrite is heated from a temperature of 1600° F. to the final firing temperature at a rate of at least 400° F. per hour but not in excess of 500° F. per hour.

References Cited by the Examiner

UNITED STATES PATENTS 2,956,024  10/1960  Maxson _____ 252—62.5

FOREIGN PATENTS 521,244  1/1954  Belgium.

TOBIAS E. LEVOW, *Primary Examiner.*

MAURICE A. BRINDISI, *Examiner.*